(12) United States Patent
Archambault (10) Patent No.: US 8,844,894 B2
(45) Date of Patent: Sep. 30, 2014

(54) SMALL FOOTPRINT SCISSOR SUSPENSION MECHANISM

(71) Applicant: Baultar I.D. Inc., Windsor (CA)

(72) Inventor: Etienne Archambault, Sherbrooke (CA)

(73) Assignee: Baultar I.D. Inc., Windsor, Quebec (CA)

( * ) Notice: Subject to any disclaimer, the term of this patent is extended or adjusted under 35 U.S.C. 154(b) by 115 days.

(21) Appl. No.: 13/724,282

(22) Filed: Dec. 21, 2012

(65) Prior Publication Data

US 2013/0206949 A1    Aug. 15, 2013

Related U.S. Application Data (60) Provisional application No. 61/579,296, filed on Dec. 22, 2011.

(51) Int. Cl.
  F16M 13/00    (2006.01)
  B60N 2/52     (2006.01)
  B60N 2/50     (2006.01)

(52) U.S. Cl.
  CPC ............ B60N 2/508 (2013.01); B60N 2/525 (2013.01)
  USPC ....... 248/588; 248/421; 297/344.15; 267/131

(58) Field of Classification Search
  USPC ......... 248/564, 581, 588, 591, 669, 132, 157, 248/421; 297/344.15, 344.16, 344.1, 297/344.12, 338; 267/131
  See application file for complete search history.

(56) References Cited

U.S. PATENT DOCUMENTS

| | | | | |
|---|---|---|---|---|
| 3,853,296 A * | 12/1974 | Forssell | ......................... | 248/567 |
| 4,382,573 A * | 5/1983 | Aondetto | ....................... | 248/561 |
| 4,448,386 A * | 5/1984 | Moorhouse et al. | .......... | 248/564 |
| 4,856,763 A * | 8/1989 | Brodersen et al. | ............. | 267/131 |
| 4,913,482 A * | 4/1990 | Hanai et al. | ................. | 296/65.02 |
| 4,943,037 A * | 7/1990 | Brodersen et al. | ............. | 267/131 |
| 5,169,112 A * | 12/1992 | Boyles et al. | ................. | 248/550 |
| 5,222,709 A * | 6/1993 | Culley et al. | .................. | 248/421 |
| 5,364,060 A * | 11/1994 | Donovan et al. | .............. | 248/588 |
| 5,584,460 A * | 12/1996 | Ropp | ............................ | 248/423 |
| 5,794,911 A * | 8/1998 | Hill | ............................... | 248/588 |
| 5,927,679 A * | 7/1999 | Hill | ................................ | 248/588 |
| 5,950,977 A * | 9/1999 | Proksch et al. | ............... | 248/421 |
| 5,957,426 A * | 9/1999 | Brodersen | ..................... | 248/588 |
| 5,975,508 A * | 11/1999 | Beard | ........................... | 267/136 |
| 5,984,410 A * | 11/1999 | Brodersen | ..................... | 297/339 |
| 6,264,163 B1 * | 7/2001 | Ivarsson | ........................ | 248/588 |
| 6,616,116 B1 * | 9/2003 | Rochau et al. | ................ | 248/564 |
| 6,616,117 B2 * | 9/2003 | Gryp et al. | .................... | 248/588 |
| 6,776,384 B2 * | 8/2004 | Igarashi | ....................... | 248/421 |
| 6,935,693 B2 * | 8/2005 | Janscha et al. | ............ | 297/344.15 |
| 7,044,553 B2 * | 5/2006 | Ropp | ....................... | 297/344.15 |
| 7,152,839 B2 * | 12/2006 | Mullinix et al. | .............. | 248/421 |

(Continued)

Primary Examiner — Bradley Duckworth
(74) Attorney, Agent, or Firm — Nath, Goldberg & Meyer; Jerald L. Meyer (57) ABSTRACT

A scissor suspension mechanism, optionally used as a seat base, comprising both small footprint base and movable element, a set of two pairs of crossed first and second scissor arms and a linkage assembly including a plurality of pivot interfaces and linkages; which are designed in a way that the crossed first and second scissor arms describe, during the total elevation stroke of the movable element with respect to the base element, both positive and negative angles with respect to each other while passing through a null angle at which the overall mechanism length is maximal.

23 Claims, 6 Drawing Sheets

(56) References Cited

U.S. PATENT DOCUMENTS

| | | | |
|---|---|---|---|
| 7,185,867 B2* | 3/2007 | Hill et al. | 248/421 |
| 7,338,126 B2* | 3/2008 | Ropp | 297/344.15 |
| 7,413,158 B1* | 8/2008 | Burer | 248/564 |
| 7,517,018 B2* | 4/2009 | Therer et al. | 297/339 |
| 7,568,675 B2* | 8/2009 | Catton | 248/588 |
| 7,669,823 B2* | 3/2010 | Brodersen | 248/421 |
| 7,896,369 B2* | 3/2011 | Tomlin et al. | 280/124.116 |
| 2004/0144906 A1* | 7/2004 | Hill et al. | 248/421 |
| 2006/0255639 A1* | 11/2006 | Ropp | 297/344.15 |
| 2007/0295882 A1* | 12/2007 | Catton | 248/588 |
| 2008/0156960 A1* | 7/2008 | Elio et al. | 248/564 |
| 2010/0117428 A1* | 5/2010 | Deml et al. | 297/344.15 |
| 2010/0133413 A1* | 6/2010 | Wahls et al. | 248/566 |

\* cited by examiner

SMALL FOOTPRINT SCISSOR SUSPENSION MECHANISM

FIELD OF THE INVENTION

The present invention generally relates to scissor suspension mechanisms. More particularly, the present invention relates to a scissor suspension mechanism which has a geometry enabling extended total elevation stroke while keeping reduced external side dimensions compared to known mechanisms.

BACKGROUND OF THE INVENTION

Known scissor suspensions provide multiple advantages over straight linear suspensions. Such scissor suspensions are mentioned in various patent documents: U.S. Pat. No. 4,856,763, US 2010/0133413, U.S. Pat. No. 4,913,482, U.S. Pat. No. 5,169,112, U.S. Pat. No. 4,943,037, U.S. Pat. No. 5,927,679, U.S. Pat. No. 5,364,060, U.S. Pat. No. 5,975,508, U.S. Pat. No. 5,984,410 and U.S. Pat. No. 6,264,163. In addition, some patent documents relate to scissor suspension mechanisms: US 2007/0295882, US 2008/0156960, U.S. Pat. No. 3,853,296 and U.S. Pat. No. 5,222,709.

Known mechanisms have a scissor geometry by including a base frame, an upper frame in space relation and movable with respect to the base frame, and two crossed arms rotatably mounted on central pivots, the crossed scissor arms extending from the base frame to the upper frame and being free to rotate relative to one and other to selectively bringing the upper frame closer to and farther away from the base frame. Mechanisms may further include a pair of side members that can be linked by one or a plurality of torsional stiffeners, to cooperate with the crossed arms. Typically, mechanisms further include various pivots attached to either the base or upper frame for allowing horizontal movement thereof.

Some scissor suspension mechanisms have been designed to reduce their overall external dimensional properties. U.S. Pat. No. 3,853,296 is directed to reduce the overall height of the lowest position of the upper frame with respect to the base frame. Such a height reduction is obtained by misalignment of the central pivots along a vertical direction. The vertical misalignment allows horizontal alignment of pivots meaning a significant gain in vertical compactness. U.S. Pat. No. 7,517,018 also discloses a scissor suspension mechanism achieving height compactness in the lowest position of the upper frame. However, known scissor suspensions achieving height compactness in the lowest position of the upper frame may have a reduced elevation range and/or enlarged external side dimensions.

In the field of railroad freight and transit, efficiency of suspensions may be an important issue due to whole body vibration. In addition, suspension mechanisms having reduced external dimensions may be required in order to offer space for legs and/or general circulation around the seat. Typical height requirement between the cushion and the floor is 16 inches at the minimum adjustment with 4 inches for adjustment upwards. Therefore, in order to keep effective suspension for different seat height adjustments, scissor mechanisms have to be provided with a total elevation stroke of about 8 inches which will permit the seat cushion to be set from about 16 to 20 inches high while keeping the suspended mass in any height set up 2 inches away from mechanical limits.

Other patent documents known to the applicant include: US 2004/0144906, US 2006/0255639, US 2010/0117428, U.S. Pat. No. 4,382,573, U.S. Pat. No. 5,584,460, U.S. Pat. No. 5,794,911, U.S. Pat. No. 5,950,977, U.S. Pat. No. 5,957,426, U.S. Pat. No. 5,984,410, U.S. Pat. No. 655,074, U.S. Pat. No. 6,616,117, U.S. Pat. No. 6,776,384, U.S. Pat. No. 6,935,693, U.S. Pat. No. 7,044,553, U.S. Pat. No. 7,152,839, U.S. Pat. No. 7,185,867, U.S. Pat. No. 7,338,126, U.S. Pat. No. 7,413,158, U.S. Pat. No. 7,568,675, U.S. Pat. No. 7,669,823, U.S. Pat. No. 7,896,369.

Therefore, there is a need for a scissor suspension mechanism that has minimized external side dimensions while keeping maximized elevation stroke along with enhanced compaction capacity.

SUMMARY OF THE INVENTION

In one aspect of the present invention, there is provided a scissor suspension mechanism that satisfies at least one of the above-mentioned needs.

More particularly, there is provided a scissor suspension mechanism for positioning a movable element in suspension with respect to a base element. The scissor suspension mechanism includes:
  a first and second pair of symmetrically facing first and second scissor arms, each first scissor arm being pivotably connected to each second scissor arm through a central pivot interface; and
  a linkage assembly comprising:
    a set of two pairs of symmetrically opposing translational pivot interfaces, each translational pivot interface connecting either a first extremity or a second extremity of each of the first and second scissor arms to the respective base element or movable element, so as to allow horizontal translation of the first extremity or the second extremity of each of the first and second scissor arms along the base element or movable element to which the first extremity or second extremity is attached, during vertical displacement of the movable element, and
    a set of two pairs of symmetrically opposing fixed pivot interfaces, each fixed pivot interface connecting either the first extremity or the second extremity of each of the first and second scissor arms to the respective base element or movable element,
  the translational pivot interfaces and the fixed pivot interfaces being configured to interspace first and second scissor arm extremities with respect to the base element and movable element, so as to allow the first and second scissor arms to describe an angle $\alpha$ with respect to each other which is negative when the movable element is displaced in a proximate position relative to the base element.

In an optional aspect, the translational pivot interfaces and the fixed pivot interfaces, connected to either the movable element or the base element, may be mutually misaligned in order to pass by each other when the first and second scissor arms are closed together or overlapping.

In another optional aspect, the linkage assembly may include a set of two pairs of symmetrically opposing translational linkages for connecting each of the corresponding four translational pivot interfaces to either the base element or the movable element, thereby minimizing vertical position variation of the translational pivot interfaces.

In another optional aspect, at least one of the translational linkages may be a rotational arm pivotably mounted about either the base element or the movable element, the rotational arm having a length sufficient to keep the corresponding translational pivot interface distant from either the base element or the movable element. Optionally, all translational linkages may be rotational arms.

In another optional aspect, the translational linkages may include at least one pair of symmetrically facing translation assemblies. Each translation assembly may include:
- a rail connected to a side of either the base element or the movable element, and
- a sliding block connected to the translational pivot interface and slidable along the rail for guidance of the sliding block relative to the movable element.

In another optional aspect, the translational linkages may include a pair of symmetrically facing support arms. Each support arm may connect one sliding block to one corresponding translational pivot interface, and has a length sufficient to distance the translational pivot interface from the sliding block. Optionally, all translational linkages may be translation assemblies.

In another optional aspect, two of the four translational linkages which connect the movable element to each first scissor arm may be translation assemblies, and the other two of the four translation linkages which connect the base element to each of the second scissor arm may be rotational arms.

In another optional aspect, the linkage assembly may include a set of two pairs of symmetrically opposing inter-spacing arms for connecting each fixed pivot interface to either the base element or the movable element.

In another optional aspect, the linkage assembly may be configured such that the translational pivot interfaces and the fixed pivot interfaces mutually avoid interference when the first and second scissor arms are closed together or overlapping.

In another optional aspect, the linkage assembly may be designed such that the scissor suspension mechanism has a length which is maximal in an intermediate position of the movable element with respect to the base element and at which the angle α is null. Additionally, the linkage assembly may be designed such that the crossed first and second scissor arms describe a positive angle with respect to each other when the movable element is displaced between the intermediate position and a distal position with respect to the base element. Optionally, the angle α may be between −30° and 80°.

In another optional aspect, the scissor suspension mechanism may include a suspension assembly connected to the movable element, the base element, the first pair of first scissor arms, the second pair of second scissor arms or a combination thereof, for enhancing suspension of the movable element during displacement with respect to the base element. Optionally, the suspension assembly may include a pair of symmetrically opposing dampers, each damper either connecting the base element to the corresponding first scissor arm, or the first scissor arm to the corresponding second scissor arm, or the movable element to the corresponding second scissor arm. Further optionally, the suspension assembly may include an air spring having a first end in connection to the base element and a second end including a mounting element which is attached to the first pair of first scissor arms with a pivot.

In another optional aspect, the scissor suspension mechanism may include a strengthening assembly positioned between the first and second pairs of first and second scissor arms for reducing torsion of the crossed first and second scissor arms. Optionally, the strengthening assembly may include at least one torsional stiffener having opposed ends which are connected to the symmetrically facing first and second scissor arms at either their corresponding translational pivot interfaces or their corresponding fixed pivot interfaces.

Optionally, a torsional stiffener may link symmetrically facing second scissor arms at their translational pivot interfaces and may link symmetrically facing first scissor arms at their fixed pivot interfaces.

In another optional aspect, each of the first and second scissor arm has opposed first and second scissor arm members about the central pivot, and the second scissor arm member of each first and second scissor arm may be shorter than the first scissor arm member of each first and second scissor arm so as to allow the corresponding torsional stiffeners to pass by first and second scissor arm member extremities without interference when the first and second scissor arms are closed together or overlapping.

In another optional aspect, the fixed pivot interface and translational pivot interfaces may be positioned such that the scissor suspension mechanism has reduced external side dimensions according to a ratio of a height stroke of the mechanism to a length of the mechanism between 66% and 75%.

In another optional aspect, each of the first and second scissor arms may have a side surface which is curved so as to form an inflexion point proximate to the central pivot interface to further contribute to avoid mutual interference of parts of the scissor suspension when the movable element is displaced relative to the base element.

It is worth mentioning that throughout the following description when the article "a" is used to introduce an element it does not have the meaning of "only one" it rather means of "one or more". For instance, the scissor suspension mechanism according to the present invention may be provided with one or more air springs without departing from the scope of the present invention.

While aspects of the invention will be described in conjunction with example embodiments, it will be understood that it is not intended to limit the scope of the invention to such embodiments. On the contrary, it is intended to cover all alternatives, modifications and equivalents as may be included as described by the present description and appended claims. The objects, advantages and other features of the present invention will become more apparent and be better understood upon reading of the following non-restrictive detailed description, given with reference to the following accompanying figures.

BRIEF DESCRIPTION OF THE FIGURES

Embodiments according to the present invention are represented in and will be further understood in connection with the following figures.

DETAILED DESCRIPTION

In the following description, the same numerical references refer to similar elements. Furthermore, for the sake of simplicity and clarity, namely so as not to unduly burden the figures with several reference numbers, only certain figures have been provided with reference numbers, and components and features of the present invention illustrated in other figures can be easily inferred therefrom. The embodiments, geometrical configurations, and/or dimensions shown in the figures are preferred for exemplification purposes only.

Moreover, although the present invention was primarily designed for a scissor mechanism suspension for a seat, for example, it may also be used in other fields, as apparent to a person skilled in the art. For this reason, expressions such as "vehicle", "seat", etc., as used herein should not be taken as to limit the scope of the present invention and includes all other kinds of materials, objects and/or purposes with which the present invention could be used and may be useful.

In addition, although the preferred embodiment of the present invention as illustrated in the accompanying drawings comprises various components and although the preferred embodiment of the scissor mechanism as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation therebetween, as well as other suitable geometrical configurations may be used for the scissor mechanism, and corresponding parts, according to the present invention, as briefly explained and as can easily be inferred herefrom by a person skilled in the art, without departing from the scope of the invention.

List of Numerical References for Some of the Corresponding Preferred Components Illustrated in the Accompanying Drawings:

| Part References | Numbers |
| --- | --- |
| base element | 2 |
| movable element | 4 |
| first scissor arms | 6a, 6b |
| second scissor arms | 8a, 8b |
| central pivot interface | 9 |
| fixed pivot interfaces | 10 |
| translational pivot interfaces | 12 |
| first scissor arm member | 14 |
| second scissor arm member | 16 |
| rail | 26 |
| sliding block | 28 |
| rotational arms | 30 |
| first pair of interspacing arms | 32a, 32b |
| second pair of interspacing arms | 34a, 34b |

-continued

| Part References | Numbers |
| --- | --- |
| pair of support arms | 36a, 36b |
| stiffener | 37 |
| torsional stiffener | 38 |
| air spring | 42 |
| air spring mounting element | 44 |
| air spring screws | 46 |
| linear guide | 260 |

In one aspect, the scissor suspension mechanism for seat typically links the vehicle frame to the upper seat. The height of the seat may be adjusted by the relative movement of the upper seat to the vehicle frame. In broader terms, the scissor suspension mechanism links a base element to a movable element and allows height adjustment of the movable element with respect to the base element while ensuring suspension therebetween.

Figure 1:
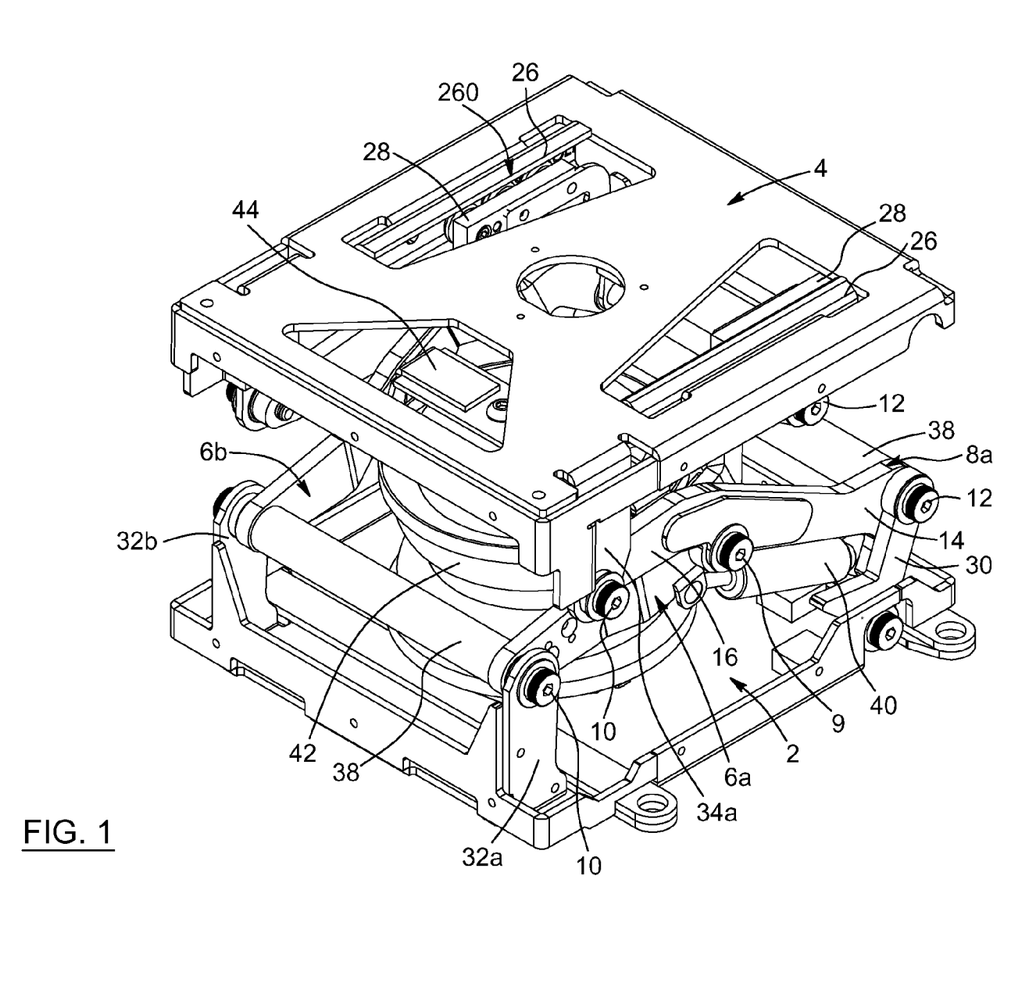
FIG. 1 is an upper perspective view of the scissor suspension mechanism according to an optional embodiment of the alleged invention.

Referring to FIG. 1, the scissor suspension mechanism is composed of a base element (2), a movable element (4), a first pair (6) of symmetrically opposing first scissor arms (6a, 6b), and a second pair (8) of symmetrically opposing second scissor arms (8a, 8b). The first and second pairs (6, 8) of first and second scissor arms (6a, 6b, 8a, 8b) are configured so as to bring the movable element (4) in space relation with the base element (2). Each first scissor arm is paired with one of the second scissor arms such that they cross each other and are linked by a central pivot interface (9) to freely rotate relative to one and other in order to provide vertical movement of the movable element (4) with respect to the base element (2). The movable element (4) may be adjusted from a proximate position where the movable element (4) is close to the base element (2), to a distal position where the movable element (4) is distant from the base element (2). The distance between the low position and the elevated position is referred to herein as the total elevation stroke ($\Delta H$) of the scissor suspension mechanism.

In another aspect, the scissor suspension mechanism also includes a linkage assembly comprising pivot interfaces to allow the first and second scissor arms to pivot with respect to either base or movable element when they are moved apart from each other. Optionally, the linkage assembly may include a set of two opposed pairs of symmetrically facing translational pivot interfaces and a set of two opposed pairs of symmetrically facing fixed pivot interfaces. Each translational pivot interface may connect either a first scissor arm member or a second scissor arm member to the respective base element or movable element, so as to allow substantially horizontal translation of the first extremity or the second extremity of each of the first and second scissor arms along the base element or movable element to which the first extremity or second extremity is attached, during substantially vertical displacement of the movable element.

Referring to FIG. 1, each first scissor arm (6a, 6b) of the scissor suspension mechanism includes:

a fixed pivot interface (10) for pivotably connecting one extremity of the first scissor arm (6a, 6b) to the base element (2) and allow interspacing there between, a translational pivot interface (12) for pivotably connecting the other extremity of the first scissor arm (6a, 6b) to the movable element (4) and allow translation thereof with respect to the movable element (4), a first scissor arm member (14) connecting the fixed pivot interface (10) to the central pivot interface (9) of the mechanism, and a second scissor arm member (16) connecting the translational pivot interface (12) to the central pivot interface (9) of the mechanism.

Each second scissor arm (8a, 8b) of the scissor suspension mechanism includes:
- a fixed pivot interface (10) for pivotably connecting one extremity of the second scissor arm (8a, 8b) to the movable element (4) and allow interspacing therebetween,
- a translational pivot interface (12) for pivotably connecting the other extremity of the second scissor arm (8a, 8b) to the base element (2) and allow translation thereof with respect to the base element (2),
- a first scissor arm member (14) connecting the translational pivot interface (12) to the central pivot interface (9) of the mechanism, and
- a second scissor arm member (16) connecting the fixed pivot interface (10) to the central pivot interface (9) of the mechanism.

Therefore, referring to FIG. 1, the scissor suspension mechanism may include a set of two opposed pairs of symmetrically facing translational pivot interfaces (12), each pair of translational pivot interfaces (12) being connected to either the base element (2) or the movable element (4). The scissor suspension mechanism further includes a set of two opposed pairs of symmetrically facing fixed pivot interfaces (10), each pair of fixed pivot interfaces (10) being connected to either the base element (2) or the movable element (4).

Still referring to FIG. 1, the pairs of translational pivot interfaces (12) are configured and located such that the extremity of the first scissor arm member (14) of each second scissor arm (8a, 8b) substantially horizontally translates along the base element (2), and that the extremity of the second scissor arm member (16) of each first scissor arm (6a, 6b) substantially horizontally translates along the movable element (4), while the movable element is displaced in a substantially vertical direction.

In some aspects, the fixed pivot interfaces and the translational pivot interfaces are configured to interspace the corresponding first or second scissor arm extremities from the base element or movable element, and allow the first and second scissor arms to describe an angle α with respect to each other which is negative when the movable element is displaced in a proximate position relative to the base element. Additionally, the scissor suspension mechanism is designed such that one pair of fixed or translational pivot interfaces of the first scissor arm pair avoids mutual interference with the other opposed pair of fixed or translational pivot interfaces of the second scissor arm pair, while allowing the crossed first and second scissor arms to describe the angle α which is negative, when they are closed together or overlapping.

In another aspect, the linkage assembly may also include a plurality of linkages for attaching the pivot interfaces to either base or movable elements such that the base and movable elements can move away from one another in a substantially perpendicular direction while keeping a reduced footprint of the overall suspension mechanism.

In some aspects, the linkage assembly may include translational linkages that refer to linkages connecting the translational pivot interfaces to either the base element or the movable element. Translational linkage may be a rotational arm pivotably mounted about the translational pivot interface, a translation assembly mounted about the translational pivot interface, such as linear guides, or any other means enabling horizontal translation of the translational pivot interface with respect to either base or movable element. It should be noted that the use of rotational arms may be more cost efficient than the use of translation assembly such as linear guide systems, while minimally affecting the parallelism between the movable element and the base element and the perpendicular displacement therebetween.

For example, referring to FIG. 1, the translational linkages of the linkage assembly may include a pair of symmetrically facing linear guides (260). Each linear guide (260) may include a rail (26) cooperating with a sliding block (28) to allow horizontal translation of the corresponding translational pivot interface (12) with respect to the movable element (4). The translational linkages may further include a pair of symmetrically facing support arms (36a, 36b), for connecting the sliding blocks (28) to their corresponding translational pivot interface (12). Each support arm connects one sliding block to one corresponding translational pivot interface, and has a length sufficient to distance the translational pivot interface from the linear guide.

In addition, still referring to FIG. 1, the translational linkages of the linkage assembly may include a pair of rotational arms (30), rotatably mounted on the base element (2) and connected to the corresponding translational pivot interfaces (12), to allow substantially horizontal translation of the pivot interfaces (12) along the base element (2). The rotational arms (30) may have a length sufficient to distance their corresponding translational pivot interfaces from the base element during substantially vertical displacement of the movable element with respect to the base element. Each rotational arm (30) may describe a rotation angle about a vertical axis minimizing vertical position variation of the connected translational pivot interface, therefore minimizing movable element (4) angle and longitudinal position variation during height variation.

Figure 10:
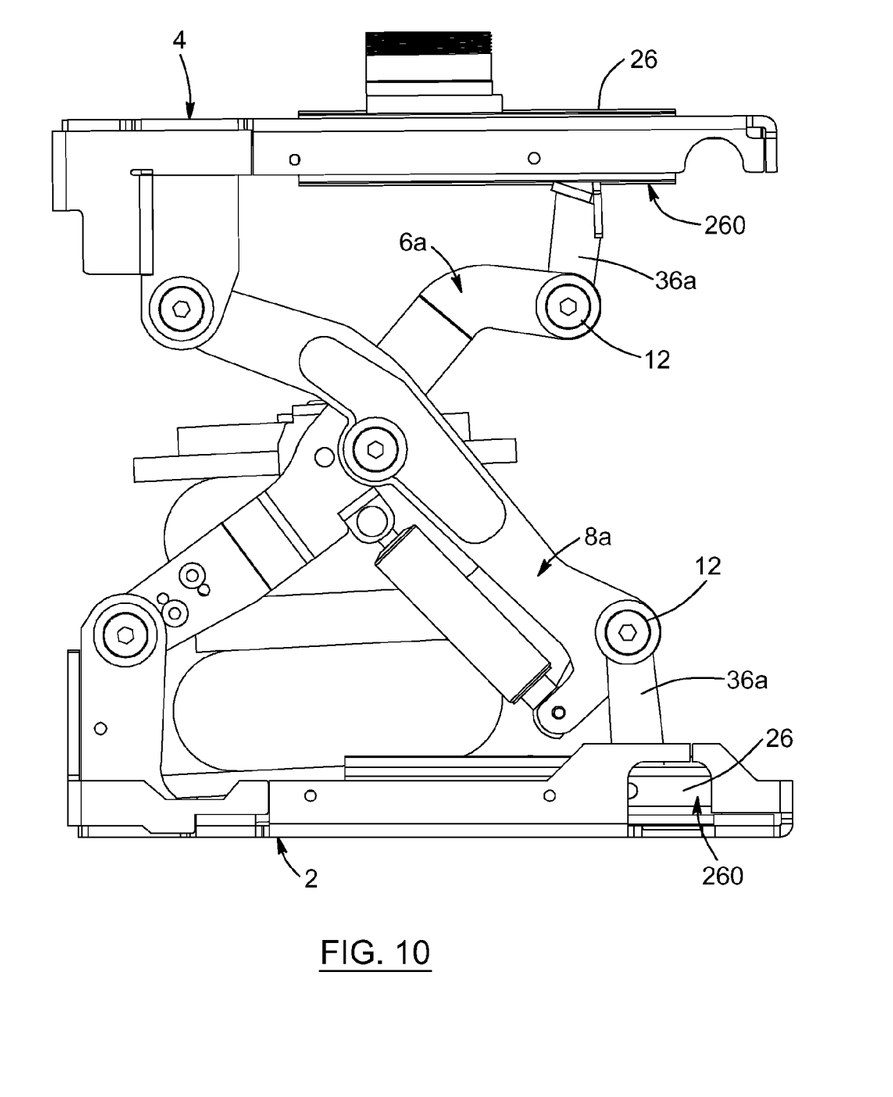
FIG. 10 is a side view of the scissor suspension mechanism in a distal position according to an optional embodiment of the alleged invention.

It should be understood that the configuration of the scissor suspension mechanism is not limited to the one illustrated in FIG. 1. Alternatively, all translational linkages connected to either the base element or the movable element may be rotational arms or any other translation assemblies. For example, as illustrated in FIG. 10, the scissor suspension mechanism may include two pairs of linear guides (260), including a rail (26) cooperating with a sliding block (28), attached to either the base element (2) or the movable element (4) about the translational pivot interfaces (12) with the pair of support arms (36a, 36b).

In other aspects, the linkage assembly may further include fixed linkages that refer to linkages connecting the fixed pivot interfaces to either the base element or the movable element. Fixed linkage may be an interspacing arm, or any other means enabling to create a space between the fixed pivot interface and either the base element or the movable element.

Referring to FIG. 1, the fixed linkages may include a first pair of symmetrically opposing interspacing arms (32a, 32b) connected to the base element (2) and extending perpendicularly from the base element (2) toward the movable element (4). The first pair of interspacing arms (32a, 32b) may have a length sufficient for maintaining distant the fixed pivot interfaces (10) of the first scissor arms (6a, 6b) from the base element (2). In addition, the fixed linkages may include a second pair of symmetrically opposing interspacing arms (34a, 34b) connected to the movable element (4) and extending perpendicularly from the movable element (4) toward the base element (2). The second pair of interspacing arms (34a, 34b) may have a length sufficient for maintaining distant the fixed pivot interfaces (12) of the second scissor arms (8a, 8b) from the movable element (4). The first and second pairs of interspacing arms of the base and movable elements are misaligned such that they pass by each other during movement of the movable element with respect to the base element. The distance between the pivot interfaces and either the base element or movable element may therefore allow the scissor arms to describe a negative angle in a proximate position of the movable element.

It should be understood that the interspacing arms, the rotational arms and the support arms are located and have a length sufficient to distance the corresponding fixed or translational pivot interfaces from either the movable or base element, therefore allowing the crossed first and second scissor arms to described a negative angle in proximate position of the movable element with respect to the base element.

In another aspect, the scissor suspension mechanism may include a strengthening assembly which is positioned between the first and second pairs of first and second scissor arms for reducing torsion of the crossed first and second scissor arms. In certain cases, the strengthening assembly may include at least one torsional stiffener having opposed ends which are connected to the symmetrically facing first and second scissor arms at either their corresponding translational pivot interfaces or their corresponding fixed pivot interfaces. Optionally, a torsional stiffener may link each symmetrically facing first and second scissor arms at their translational pivot interfaces or their fixed pivot interfaces.

Figure 2:
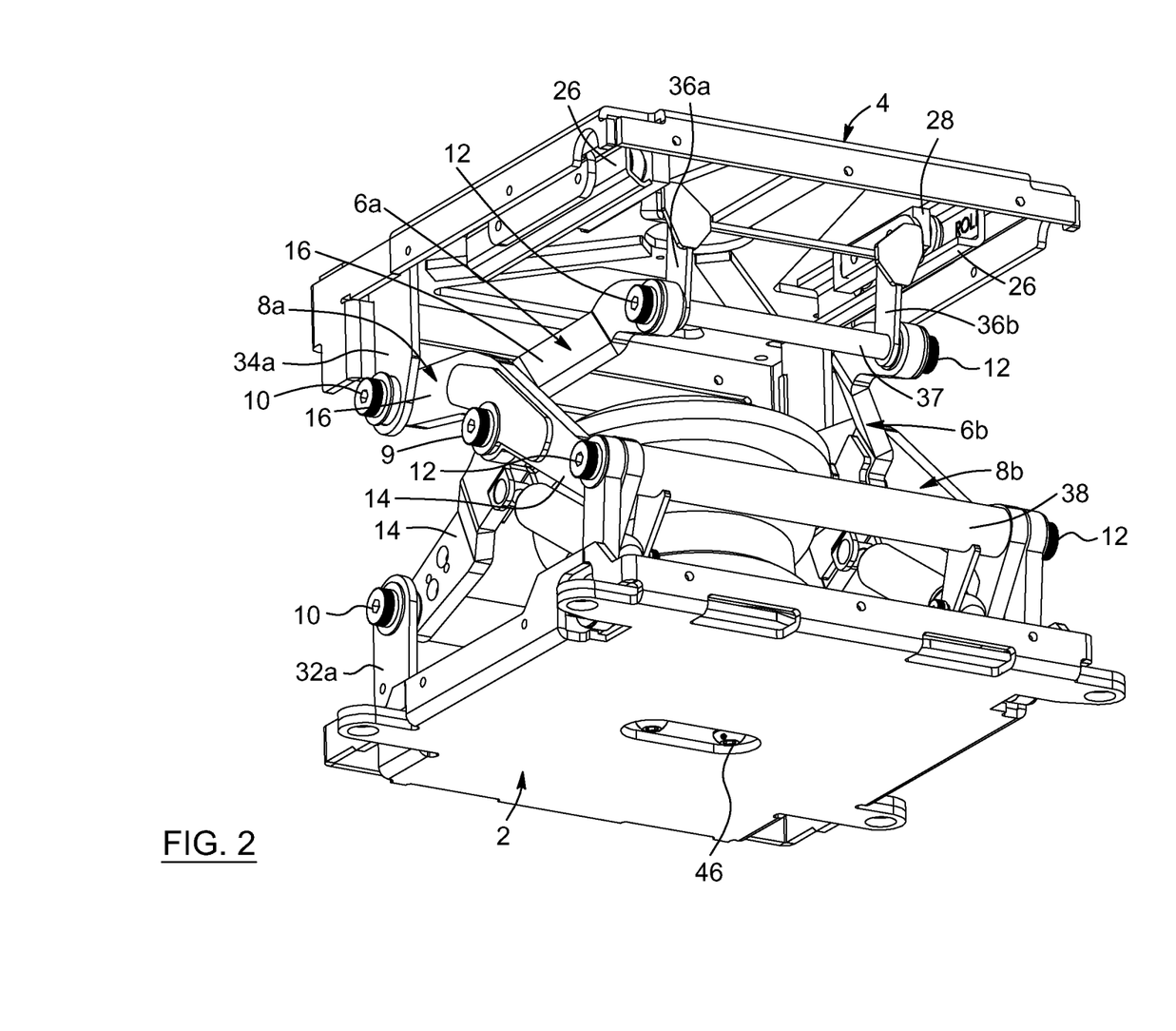
FIG. 2 is a lower perspective view of the scissor suspension mechanism according to an optional embodiment of the alleged invention.

Referring to FIG. 2, the two support arms (36a, 36b) may be rigidly linked to each other with a stiffener (37) to form a translational means enhancing stability of the overall mechanism. A torsional stiffener (38) may link the fixed pivot interfaces (10) of the first pair of scissor arms (6a, 6b) and another torsional stiffener (38) may link the translational pivot interfaces (12) of the second pair of scissor arms (8a, 8b).

In some aspects, the pivot interfaces and linkages may be configured to allow some or all the parts of the scissor suspension mechanism to pass by each other without mutual interference when the first and second arms of each first and second pair cross each other during displacement of the movable element with respect to the base element.

For example, as illustrated in the figures, the second scissor arm member (16) of each scissor arm (6a, 6b, 8a, 8b) is shorter than the first scissor arm member (14) of each scissor arm (6a, 6b, 8a, 8b) so as to allow each torsional stiffener (38) on the first scissor arm member (14) to pass by the second scissor arm member (16) extremities of the crossing scissor arms without mutual interference when the movable element is displaced with respect to the base element.

In another aspect, referring to FIGS. 1 and 2, each first scissor arm (6a, 6b) may have a front surface which is curved so as to form an inflexion point proximate to the central pivot interface (9) between the first and second scissor arm member (14, 16) such that the first and second scissor arm members (14, 16) of each first scissor arm (6a, 6b) form opposite non-planar sections about the central pivot interface (9). Each first scissor arm (6a, 6b) may also have a side surface which is curved so as to form another inflexion point proximate to the central pivot interface (9) between the first and second scissor arm members (14, 16) of each first scissor arm (6a, 6b).

Figure 9:
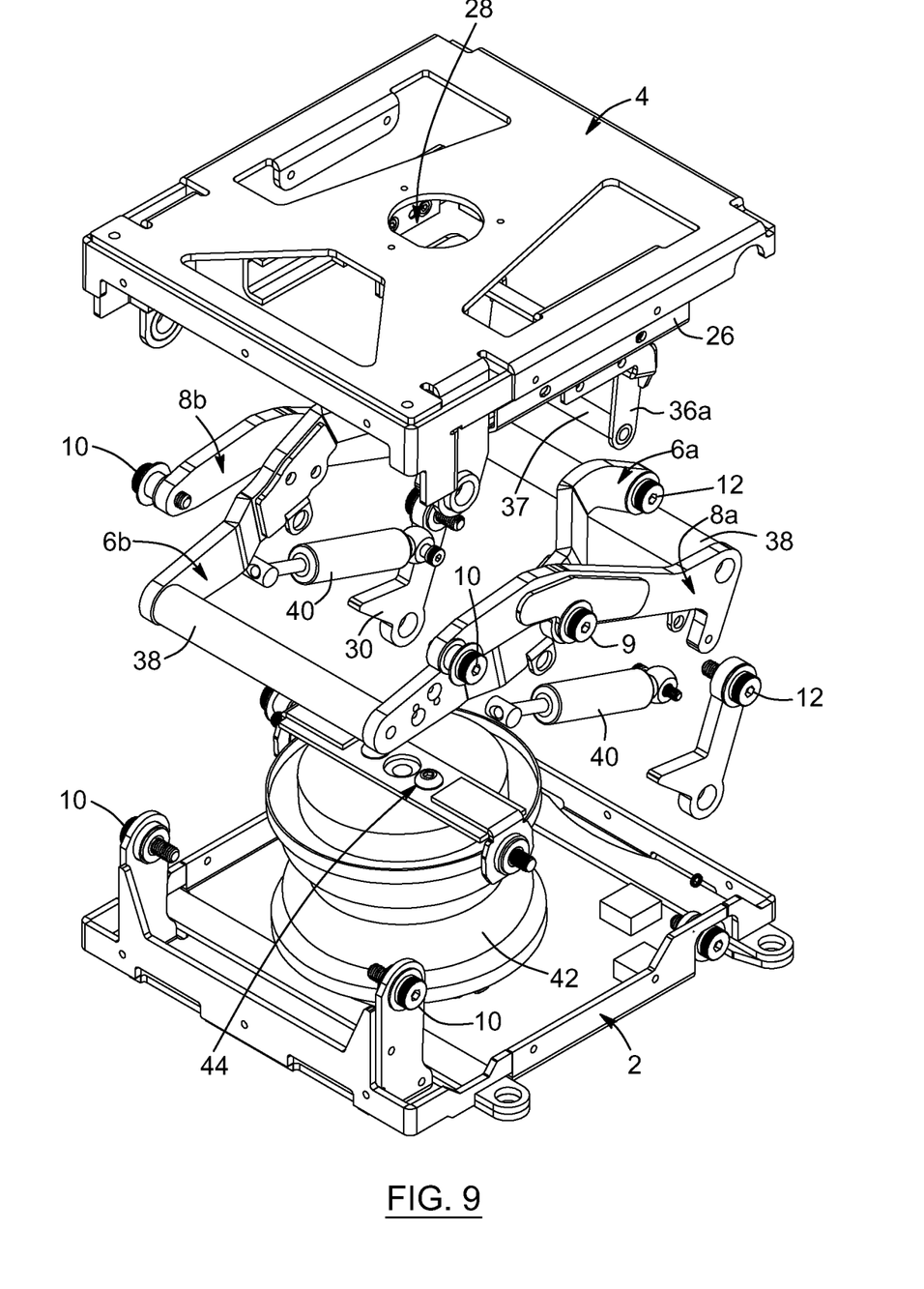
FIG. 9 is an exploded view of the scissor suspension mechanism according to an optional embodiment of the alleged invention.

In another aspect, the scissor suspension mechanism may include an additional suspension assembly for enhancing suspension of the overall mechanism. Referring to FIGS. 1 and 9, the suspension assembly may include a pair of symmetrically opposing dampers (40) between the first and second pairs of scissor arms (6, 8). Preferably, each damper (40) is connected to the first scissor arm member (14) of each scissor arm (6a, 6b, 8a, 8b). The suspension assembly may also include an air spring (42) having a first end in connection to the base element (2) and a second end including a mounting element (44) which is attached to the first scissor arms (6a, 6b) of the first pair (6) with a pivot. Referring to FIG. 2, the air spring (42) may be attached to the base element (2) with air spring screws (46).

It should be understood that the location and configuration of the dampers is not limited to what is illustrated in the figures. For example, one damper may link the movable element to one second scissor arm, or the base element to one first scissor arm, or a first scissor arm to the corresponding crossed scissor arm. Additionally, the dampers may be connected to either the first scissor arm member or the second scissor arm member.

In another aspect, the scissor suspension mechanism allows the movable element to move with respect to the base element between a proximate position and a distal position. In the distal position of the movable element, the first and second scissor arms of each first and second pair cross about the central pivot interface with a positive angle with respect to each other. In the proximal position of the movable element, the first and second scissor arms of each first and second pair cross about the central pivot interface with a negative angle with respect to each other. While moving between the proximate and distal positions, the movable element passes through an intermediate position where all the pivot interfaces of the first and second scissor arms are aligned with a null angle between them. By allowing the scissor arms to describe a negative angle according to the proximate position of the movable element, the scissor suspension mechanism may achieve compact external side dimensions and height dimension. Additionally, the scissor suspension may achieve a high spreading capacity while keeping, a relatively low maximum angle α described by the scissor arms when the movable element is in distal position, thereby providing stability and strength to the mechanism. Further explanations are provided herebelow.

It should be understood that the external side dimensions of the scissor suspension mechanism include a width (W) and a length (L) according to maximum side dimensions of either the base element or the movable element. Additionally, the distance between two facing fixed pivot interfaces of the second pair of second scissor arms which are connected to either the base element or the movable element, is referred to as the distance (w). The distance between a fixed pivot interface of a second scissor arm and a translational pivot interface of the corresponding crossed first scissor arm is varying according to the movement of the movable element and is referred to as the distance (I). It should be further understood that the distances are measured in a same plane, according to an upper view of the mechanism, even though the base element pivot interfaces may not be aligned in a same plane.

Figure 4:
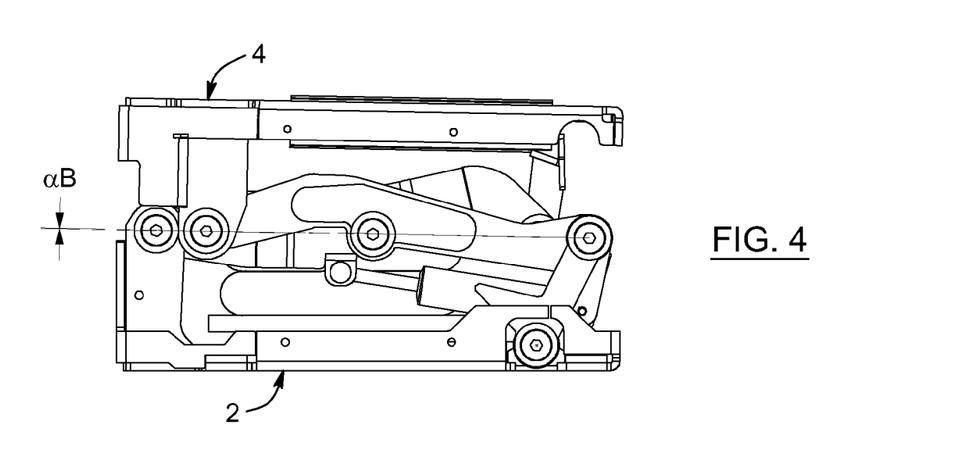
FIG. 4 is a side view of the scissor suspension mechanism in an intermediate position according to an optional embodiment of the alleged invention.

Referring to FIG. 4, the intermediate position of the movable element (4) is encountered when all crossed scissor arm pivot interfaces (9, 10, 12) are horizontally aligned and therefore describing a null angle $\alpha_B$. It should be noted that while the movable element (4) is in its intermediate position, the distance (I) is maximal. Indeed, the distance (I) is maximized in the intermediate position as illustrated in FIG. 4. This maximal distance (I) is referred to as $I_i$ or $I_{max}$. It should be understood that the mechanism design, as described above, allows to keep the distance (I) inferior to the length (L) of the mechanism, such $I_{max} < L$, therefore ensuring compactness in each position of the movable element with respect to the base element.

Figure 3:
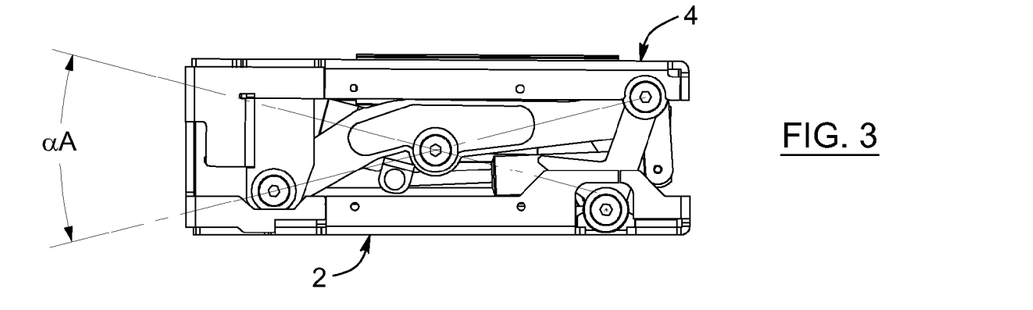
FIG. 3 is a side view of the scissor suspension mechanism in a proximate position according to an optional embodiment of the alleged invention.

Referring to FIG. 3, the proximate position of the movable element (4) is encountered when the pivot interfaces (9, 10, 12) of a first scissor arm (6a, 6b) describe a maximal negative angle $\alpha_A$ with respect to the pivot interfaces (9, 10, 12) of the crossed second scissor arm (8a, 8b). The distance (I) in the proximate position may be referred to as $I_p$.

Figure 5:
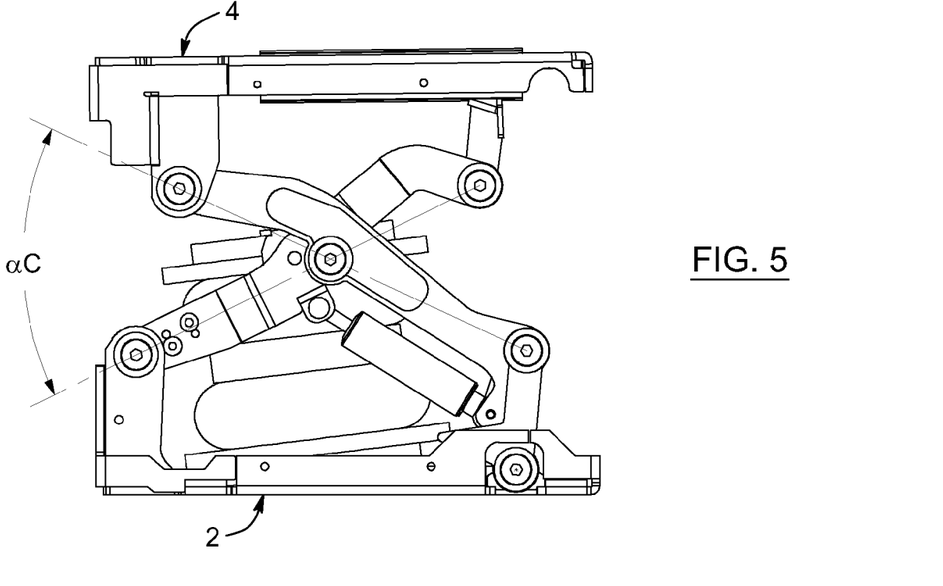
FIG. 5 is a side view of the scissor suspension mechanism in a distal position according to an optional embodiment of the alleged invention.

Referring to FIG. 5, the distal position of the movable element (4) is encountered when the pivot interfaces (9, 10, 12) of a first scissor arm (6a, 6b) describe a maximal positive angle $\alpha_c$ with respect to the pivot interfaces (9, 10, 12) of the crossed second scissor arm (8a, 8b). The distance (I) in the distal position is referred to as $I_d$.

Figure 6:
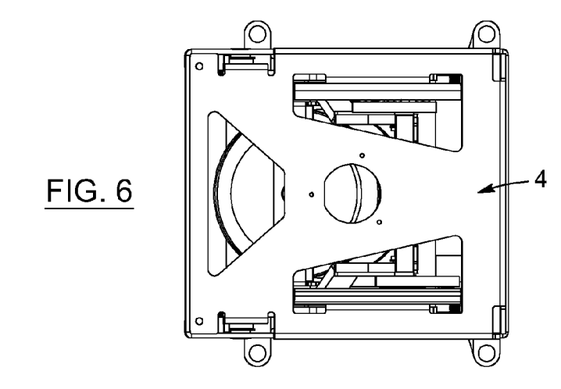
FIG. 6 is a top view of an upper frame according to an optional embodiment of the alleged invention.
Figure 7:
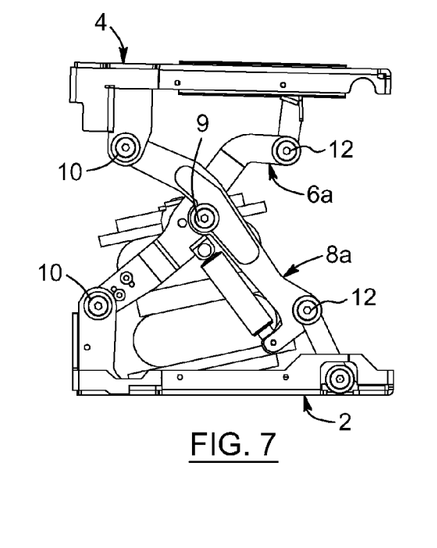
FIG. 7 is a side view of the scissor suspension mechanism in a distal position according to an optional embodiment of the alleged invention.
Figure 8:
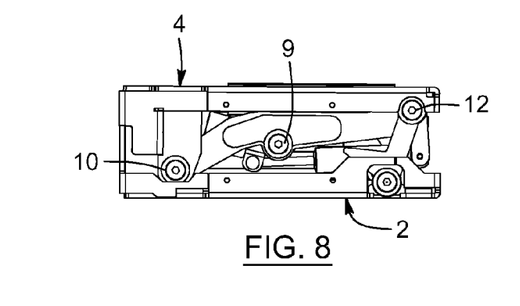
FIG. 8 is a side view of the scissor suspension mechanism in a proximate position according to an optional embodiment of the alleged invention.

As the movable element (4) goes above and below its intermediate position, the scissor mechanism is advantageously configured to reduce the distance between opposite pivot interfaces of a pair of crossed scissor arms such that $I_p$ and $I_d$ are inferior to $I_i$, and preferably $I_i I_p I_d$. The maximal external side dimensions (W by L) of the scissor suspension mechanism, also referred to as the footprint of the scissor suspension mechanism, may be about 12 by 12 inches (FIG. 6) while achieving a total elevation stroke ($\Delta H$) of about 8 to 9 inches, the movable element going from a proximate height $H_{min}$ (FIG. 7) of about 4 inches to a distal height $H_{max}$ (FIG. 8) of about 12 to 13 inches. The ratio ($\Delta H$)/L may be between 66% and 75%. In some aspects, the ratio ($\Delta H$)/L may be kept high even for a relatively low maximum crossed scissor arms angle of about 79° as shown in FIG. 7 when the movable element is in the distal position. It should be noted that the value of the crossed scissor arms angle $\alpha$ is related to the scissor suspension mechanism strength during the application of a frontward or rearward force. Advantageously, the reduced angle $\alpha$ in the distal position of the movable element according to the present invention enhances the mechanism strength accordingly. Optionally, the angle $\alpha$ may vary between −30° and 80°. Further optionally, the angle $\alpha$ varies between −29° and 79°.

It should be understood that the terms "horizontal" and "vertical" refers to directions as illustrated on the figures. However, the scissor suspension mechanism may be oriented differently without disturbing its operation.

It should be further noted that the scope of the present invention is not limited to the example embodiments set forth in the figures, but should be given the broadest interpretation as inferred from the description as a whole. Numerous modifications could be made to the above-described embodiments without departing from the scope of the invention, as apparent to a person skilled in the art.

The invention claimed is:

1. A scissor suspension mechanism for positioning a movable element in suspension with respect to a base element, the scissor suspension mechanism comprising:
    a first and second pair of symmetrically facing first and second scissor arms, each first scissor arm being pivotably connected to each second scissor arm through a central pivot interface; and
    a linkage assembly comprising:
        a set of two pairs of symmetrically opposing translational pivot interfaces, each translational pivot interface connecting either a first extremity or a second extremity of each of the first and second scissor arms to the respective base element or movable element, so as to allow horizontal translation of the first extremity or the second extremity of each of the first and second scissor arms along the base element or movable element to which the first extremity or second extremity is attached, during vertical displacement of the movable element, and
        a set of two pairs of symmetrically opposing fixed pivot interfaces, each fixed pivot interface connecting either the first extremity or the second extremity of each of the first and second scissor arms to the respective base element or movable element,
    the translational pivot interfaces and the fixed pivot interfaces being configured to interspace first and second scissor arm extremities with respect to the base element and movable element, so as to allow the first and second scissor arms to describe an angle $\alpha$ with respect to each other which is negative when the movable element is displaced in a proximate position relative to the base element.

2. The scissor suspension mechanism of claim 1, wherein the translational pivot interfaces and the fixed pivot interfaces, connected to either the movable element or the base element, are mutually misaligned in order to pass by each other when the first and second scissor arms are closed together or overlapping.

3. The scissor suspension mechanism of claim 1, wherein the linkage assembly comprises a set of two pairs of symmetrically opposing translational linkages for connecting each of the corresponding four translational pivot interfaces to either the base element or the movable element, thereby minimizing vertical position variation of the translational pivot interfaces.

4. The scissor suspension mechanism of claim 3, wherein at least one of the translational linkages is a rotational arm pivotably mounted about either the base element or the movable element, the rotational arm having a length sufficient to keep the corresponding translational pivot interface distant from either the base element or the movable element.

5. The scissor suspension mechanism of claim 4, wherein all translational linkages are rotational arms.

6. The scissor suspension mechanism of claim 3, wherein the translational linkages comprise at least one pair of symmetrically facing translation assemblies, each translation assembly comprising:
    a rail connected to a side of either the base element or the movable element, and
    a sliding block connected to the translational pivot interface and slidable along the rail for guidance of the sliding block relative to the movable element.

7. The scissor suspension mechanism of claim 6, wherein the translational linkages comprise a pair of symmetrically facing support arms, each support arm connecting one sliding block to one corresponding translational pivot interface, and having a length sufficient to distance the translational pivot interface from the sliding block.

8. The scissor suspension mechanism of claim 7, wherein all translational linkages are translation assemblies.

9. The scissor suspension mechanism of claim 6, wherein two of the four translational linkages which connect the movable element to each first scissor arm are translation assemblies, and the other two of the four translation linkages which connect the base element to each of the second scissor arm are rotational arms.

10. The scissor suspension mechanism of claim 1, wherein the linkage assembly comprises a set of two pairs of symmetrically opposing interspacing arms for connecting each fixed pivot interface to either the base element or the movable element.

11. The scissor suspension mechanism of claim 1, wherein the linkage assembly is configured such that the translational pivot interfaces and the fixed pivot interfaces mutually avoid interference when the first and second scissor arms are closed together or overlapping.

12. The scissor suspension mechanism of claim 1, wherein the linkage assembly is designed such that the scissor suspension mechanism has a length which is maximal in an intermediate position of the movable element with respect to the base element and at which the angle α is null.

13. The scissor suspension mechanism of claim 12, wherein the linkage assembly is designed such that the crossed first and second scissor arms describe a positive angle with respect to each other when the movable element is displaced between the intermediate position and a distal position with respect to the base element.

14. The scissor suspension mechanism of claim 1, wherein the angle α is between −30° and 80°.

15. The scissor suspension mechanism of claim 1, comprising a suspension assembly connected to the movable element, the base element, the first pair of first scissor arms, the second pair of second scissor arms or a combination thereof, for enhancing suspension of the movable element during displacement with respect to the base element.

16. The scissor suspension mechanism of claim 1, wherein the suspension assembly comprises a pair of symmetrically opposing dampers, each damper either connecting the base element to the corresponding first scissor arm, or the first scissor arm to the corresponding second scissor arm, or the movable element to the corresponding second scissor arm.

17. The scissor suspension mechanism of claim 16, wherein the suspension assembly comprises an air spring having a first end in connection to the base element and a second end including a mounting element which is attached to the first pair of first scissor arms with a pivot.

18. The scissor suspension mechanism of claim 1, comprising a strengthening assembly positioned between the first and second pairs of first and second scissor arms for reducing torsion of the crossed first and second scissor arms.

19. The scissor suspension mechanism of claim 18, wherein the strengthening assembly comprises at least one torsional stiffener having opposed ends which are connected to the symmetrically facing first and second scissor arms at either their corresponding translational pivot interfaces or their corresponding fixed pivot interfaces.

20. The scissor suspension mechanism of claim 19, wherein a torsional stiffener links symmetrically facing second scissor arms at their translational pivot interfaces and links symmetrically facing first scissor arms at their fixed pivot interfaces.

21. The scissor suspension mechanism of claim 20, wherein each of the first and second scissor arm has opposed first and second scissor arm members about the central pivot, and the second scissor arm member of each first and second scissor arm is shorter than the first scissor arm member of each first and second scissor arm so as to allow the corresponding torsional stiffeners to pass by first and second scissor arm member extremities without interference when the first and second scissor arms are closed together or overlapping.

22. The scissor suspension mechanism of claim 1, wherein the fixed pivot interface and translational pivot interfaces are positioned such that the scissor suspension mechanism has reduced external side dimensions according to a ratio of a height stroke of the mechanism to a length of the mechanism between 66% and 75%.

23. The scissor suspension mechanism of claim 1, wherein each of the first and second scissor arms has a side surface which is curved so as to form an inflexion point proximate to the central pivot interface to further contribute to avoid mutual interference of parts of the scissor suspension when the movable element is displaced relative to the base element.

* * * * *